United States Patent
Kakinami et al.

(10) Patent No.: US 7,243,749 B2
(45) Date of Patent: Jul. 17, 2007

(54) MOTOR-DRIVEN WHEEL SMALL IN SIZE AND IMPROVED IN RIDE COMFORT AND EASE OF ASSEMBLY

(75) Inventors: Takuma Kakinami, Toyota (JP); Takeo Yamamoto, Nissin (JP); Shigekazu Yogo, Nagoya (JP)

(73) Assignee: Toyota Jidosha Kabushiki Kaisha, Tokyo (JP)

( * ) Notice: Subject to any disclaimer, the term of this patent is extended or adjusted under 35 U.S.C. 154(b) by 210 days.

(21) Appl. No.: 11/126,229

(22) Filed: May 11, 2005

(65) Prior Publication Data
US 2005/0257971 A1    Nov. 24, 2005

(30) Foreign Application Priority Data
May 18, 2004  (JP)  ............................. 2004-148042

(51) Int. Cl.
B60K 1/00    (2006.01)
(52) U.S. Cl. ...................... 180/65.5; 301/6.5; 464/178
(58) Field of Classification Search ............... 180/65.5; 301/6.5; 464/178
See application file for complete search history.

(56) References Cited

U.S. PATENT DOCUMENTS

| | | | | |
|---|---|---|---|---|
| 5,087,229 A | * | 2/1992 | Hewko et al. | 475/149 |
| 5,127,485 A | * | 7/1992 | Wakuta et al. | 180/65.5 |
| 5,156,579 A | * | 10/1992 | Wakuta et al. | 475/161 |
| 5,163,528 A | * | 11/1992 | Kawamoto et al. | 180/65.5 |
| 5,322,141 A | * | 6/1994 | Brunner et al. | 180/65.5 |
| 5,382,854 A | * | 1/1995 | Kawamoto et al. | 310/67 R |
| 5,486,053 A | * | 1/1996 | Beagley et al. | 384/513 |
| 5,633,544 A | * | 5/1997 | Toida et al. | 310/67 R |
| 5,691,584 A | * | 11/1997 | Toida et al. | 310/67 R |
| 5,894,902 A | * | 4/1999 | Cho | 180/65.5 |
| 6,113,119 A | * | 9/2000 | Laurent et al. | 280/124.1 |
| 6,193,419 B1 | * | 2/2001 | Krude et al. | 384/544 |
| 6,230,848 B1 | * | 5/2001 | Niebling et al. | 188/18 A |

(Continued)

FOREIGN PATENT DOCUMENTS

WO    WO 02/083446 A1    10/2002

OTHER PUBLICATIONS

Nagaya et al., "Development of an In-Wheel Motor with Advanced Dynamic-Damper Mechanism (20025544)," Proceedings of 2002 JSAE Autumn Convention, No. 83-02, The Society of Automotive Engineers of Japan, pp. 9-12, 2002, with partial translation.

Primary Examiner—Jeff Restifo
(74) Attorney, Agent, or Firm—Oliff & Berridge, PLC

(57) ABSTRACT

A motor-driven wheel includes a wheel disc, a wheel hub, a knuckle, a hub bearing, a constant-velocity joint, an in-wheel motor, and a spring. The center of swing of the constant-velocity joint is placed closer to the outside of the vehicle relative to the hub bearing. Since such components of the constant-velocity joint as an inner race, balls and a cage are placed differently in position from the hub bearing, the hub bearing can be reduced in diameter. An outer race of the constant-velocity joint is integrated with the wheel hub into a single part and has an opening facing the outside of the vehicle. Since the opening is large and shallow, the work of installing the cage, balls and inner race and securing them with a snap ring is facilitated.

6 Claims, 4 Drawing Sheets

U.S. PATENT DOCUMENTS

| | | | |
|---|---|---|---|
| 6,450,585 B1 * | 9/2002 | Kochsiek | 301/124.1 |
| 6,722,459 B1 * | 4/2004 | Wendl et al. | 180/65.5 |
| 6,729,769 B2 * | 5/2004 | Sahashi et al. | 384/537 |
| 6,852,061 B2 * | 2/2005 | Schoon | 475/348 |
| 6,880,841 B2 * | 4/2005 | Wang et al. | 280/93.512 |
| 6,981,800 B2 * | 1/2006 | Shibuya | 384/544 |
| 7,118,119 B2 * | 10/2006 | Amanuma | 280/124.135 |
| 7,121,367 B2 * | 10/2006 | Ajiro et al. | 180/65.5 |
| 7,125,171 B2 * | 10/2006 | Ouchi | 384/537 |

* cited by examiner

MOTOR-DRIVEN WHEEL SMALL IN SIZE AND IMPROVED IN RIDE COMFORT AND EASE OF ASSEMBLY

This nonprovisional application is based on Japanese Patent Application No. 2004-148042 filed with the Japan Patent Office on May 18, 2004, the entire contents of which are hereby incorporated by reference.

BACKGROUND OF THE INVENTION

1. Field of the Invention

The present invention relates to a motor-driven wheel improving ride comfort of vehicles.

2. Description of the Background Art

An in-wheel motor drive unit that uses a motor as the mass of a damper and that supports the motor by a motor suspension is known (Document 1: International Patent Publication No. WO02/083446A1, Document 2: Go Nagaya et al., "Development of an In-Wheel Motor with Advanced Dynamic-Damper Mechanism (20025544)", Proceedings of 2002 JSAE Autumn Convention, No. 83-02, The Society of Automotive Engineers of Japan, Nov. 26, 2002, pp. 9-12). The motor is coupled to a wheel of a wheel and tire unit (hereinafter referred to as wheel unit) to rotate the wheel unit. The motor suspension supports the motor to allow the motor to vibrate in the up-and-down direction of the vehicle's body and separates the motor from unsprung weights. The wheel is supported on the vehicle's body by a suspension arm. Regarding this in-wheel motor drive system, as the wheel unit vibrates, the vibrations are transmitted through the wheel to the motor to cause the motor to vibrate in the up-and-down direction of the vehicle's body. The vibrations of the motor cancel vibrations of unsprung components. Here, a flexible coupling is used for smoothly transmitting power generated by the motor to the wheel unit even if respective rotational axes of the motor and the wheel unit become eccentric from each other.

In the case where the motor is mounted to serve as the dynamic damper as mentioned above, the motor swings and moreover an axial force is exerted on the motor when the vehicle corners. Then, such an axial force has to be supported.

For supporting the motor in the axial direction, an outer race of a constant-velocity joint and a wheel hub may be integrated into a single part. In this case, however, it is necessary to avoid an increase in diameter of a hub bearing as well as deterioration in ease of installation of a snap ring serving to axially restrict an output shaft transmitting motor torque and an inner race of the constant-velocity joint. Accordingly, some considerations have to be taken regarding the axial support of the motor.

SUMMARY OF THE INVENTION

An object of the present invention is to provide a motor-driven wheel that is small in size and improved in ease of assembly while improving ride comfort of vehicles.

In summary, the present invention is a motor-driven wheel including: a motor supported swingably in up-and-down direction of a body of a vehicle and rotating a wheel unit; a hub bearing rotatably supporting the wheel unit; and a constant-velocity joint provided on a power transmission path extending from an output shaft of the motor to the wheel unit and having its center of swing located closer to outside of the vehicle relative to the hub bearing. The constant-velocity joint includes: an outer race integrated with a wheel hub to which a wheel of the wheel unit is fixed, into a single part, and having a first opening facing the outside of the vehicle; an inner race connected to the output shaft of the motor in a manner that allows motive power to be transmitted; and a rolling body transmitting the motive power between the inner race and the outer race.

Preferably, the motor-driven wheel further includes a knuckle connected to a suspension arm attached to the body of the vehicle, and the motor is connected through an elastic member to the knuckle.

Preferably, the hub bearing is fixed to the knuckle.

Preferably, the constant-velocity joint further includes a cage restraining position of the rolling body, and the first opening is larger in diameter than an assembly into which the cage, the rolling body and the inner race are assembled.

Preferably, the outer race further has a second opening facing inside of the vehicle, and a rotational shaft connected to the inner race passes through the second opening. The first opening is larger than the second opening, and the hub bearing rotatably supports a portion where the rotational axis passes through of the outer race integrated with the wheel hub into the single part.

Preferably, the motor-driven wheel further includes a cap covering the first opening.

Thus, a chief advantage of the present invention is that the diameter of the hub bearing can be decreased since the center of swing of the constant-velocity joint is positioned closer to the outside of the vehicle relative to the hub bearing.

Further, since the opening of the outer race of the constant-velocity joint is placed to face the outside of the vehicle, the motor-driven wheel with the easily installed constant-velocity joint can be implemented.

Furthermore, since the distance between the motor and the constant-velocity joint is made larger, the extent to which the constant-velocity joint swings is made smaller relative to that of the motor and accordingly the constant-velocity joint can be reduced in size.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
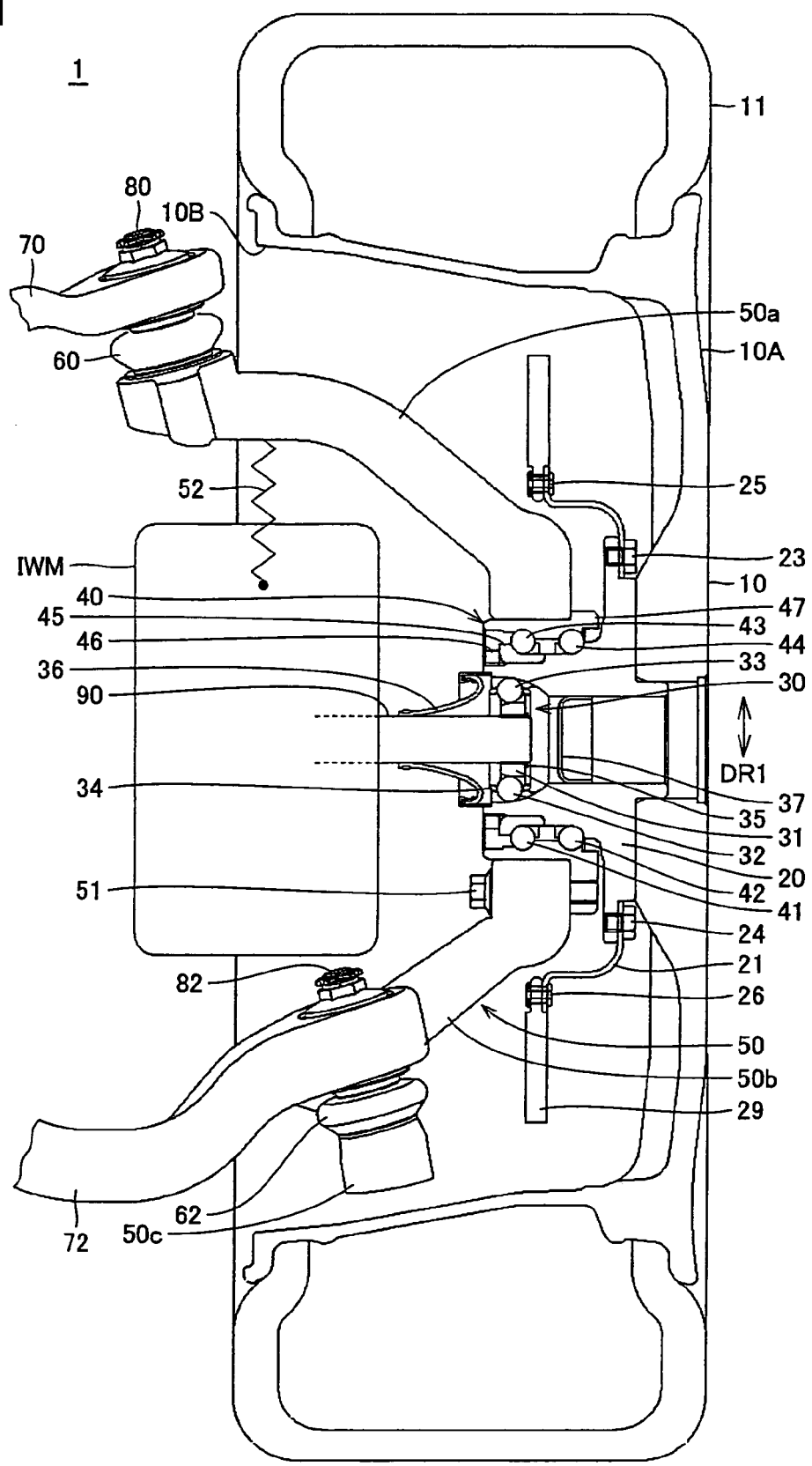
FIG. 1 shows an example to be studied of the placement of a constant-velocity joint of a motor-driven wheel.

An embodiment of the present invention is hereinafter described in detail with reference to the drawings. In the drawings, like components are denoted by like reference characters and a description thereof is not repeated.

Example to be Studied of Placement of Constant-Velocity Joint

FIG. 1 shows an example to be studied of the placement of a constant-velocity joint of a motor-driven wheel.

Referring to FIG. 1, firstly an entire structure of the motor-driven wheel is described. Motor-driven wheel 1 includes a wheel disc 10, a wheel hub 20, a knuckle 50, a hub bearing 40, a constant-velocity joint 30, an in-wheel motor IWM, and a spring 52.

Motor-driven wheel 1 is supported by a suspension arm that is a wheel support unit. The suspension arm includes an upper arm 70 and a lower arm 72. Upper arm 70 and an upper knuckle 50a are connected by a kingpin 80 and a ball joint 60. Lower arm 72 and a lower knuckle 50c are connected by a kingpin 82 and a ball joint 62. Lower knuckles 50b and 50c are connected behind lower arm 72 as seen in FIG. 1.

The structure of the components each is now described.

Wheel disc 10 is substantially in the shape of a cup and includes a disc portion 10A and a rim portion 10B. Wheel disc 10 houses therein wheel hub 20, a disc rotor 29, hub bearing 40, constant-velocity joint 30 and in-wheel motor IWM. A tire 11 is secured to the outer edge of rim portion 10B of wheel disc 10.

Wheel disc 10 is coupled for example at disc portion 10A to wheel hub 20, using such fastening members as bolts (not shown).

To wheel hub 20, a disc support member 21 is attached with bolts 23, 24. To the outer periphery of disc support member 21, disc rotor 29 is attached with bolts 25, 26.

Wheel hub 20 is rotatably supported by hub bearing 40. Hub bearing 40 is secured with knuckle 50 and a bolt 51. In-wheel motor IWM has its casing connected to knuckle 50 through spring 52 that is an "elastic member." Thus, while in-wheel motor IWM is supported so that it does not rotate with respect to knuckle 50, in-wheel motor IWM is supported so that it can vibrate in the up-and-down direction DR1 of the vehicle's body.

An output shaft 90 of in-wheel motor IWM is connected to constant-velocity joint 30. Constant-velocity joint 30 permits angular displacement between the rotational axis of output shaft 90 and the rotational axis of wheel hub 20.

Figure 2:
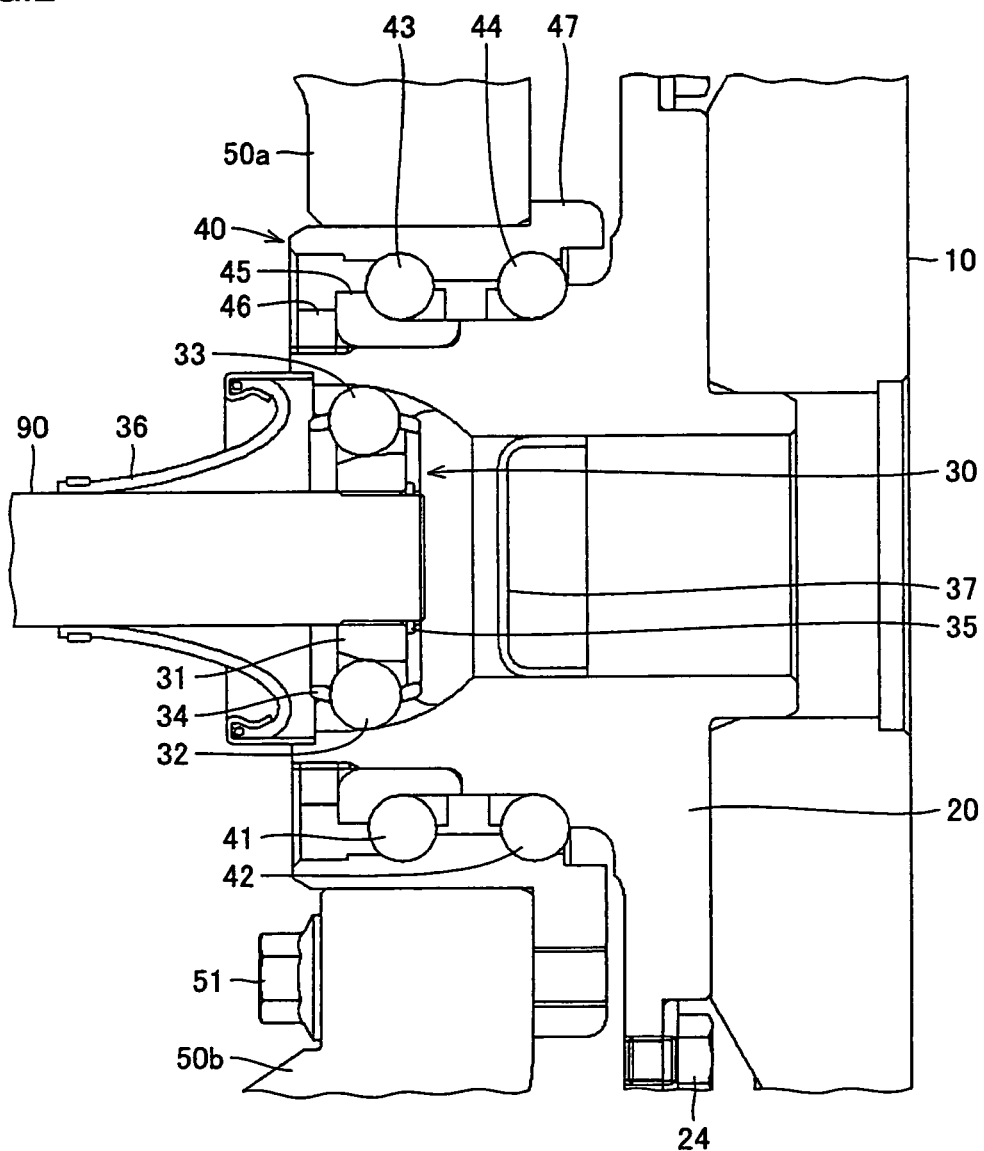
FIG. 2 is an enlarged view of constant-velocity joint 30, a hub bearing 40 and their neighborhood in FIG. 1.

FIG. 2 is an enlarged view of constant-velocity joint 30, hub bearing 40 and their neighborhood in FIG. 1.

Referring to FIG. 2, hub bearing 40 includes a hub bearing casing 47, balls 41-44, a ball holding ring 45 that holds balls 41, 43, and a nut 46 for holding ball holding ring 45 to prevent ball holding ring 45 from coming off wheel hub 20. Hub bearing casing 47 of hub bearing 40 is fixed at lower knuckle 50b of knuckle 50 by flanged bolt 51.

Constant-velocity joint 30 includes an inner race 31 spline-fitted with output shaft 90 of the motor, a snap ring 35 preventing inner race 31 from coming off output shaft 90, balls 32, 33, a cage 34 restraining the positions of balls 32, 33, and a boot 36 and a cap 37 for preventing leakage of grease enclosed in the inside.

The outer race of constant-velocity joint 30 and wheel hub 20 are integrated into a single part, and motive power transmitted from output shaft 90 of the motor is first transmitted from inner race 31 to balls 32, 33. Balls 32, 33 are "rolling bodies" transmitting motive power while rolling. The motive power is then transmitted from balls 32, 33 to wheel hub 20 integrated with the outer race into a single part.

As shown in FIGS. 1 and 2, the in-wheel motor requires a considerably large space in the wheel portion for mounting the motor. In particular, when in-wheel motor IWM is mounted to serve as a dynamic damper, a gap or space between the motor and peripheral components is an issue to be considered since the motor swings. Thus, concerning mounting of the motor, a challenge is to make the motor-driven wheel more lightweight and compact.

The constant-velocity joint has to support axial centrifugal force and inertial force applied to motor components when the vehicle corners. While in-wheel motor IWM is swingably supported by spring 52, spring 52 cannot satisfactorily support forces applied in the direction of the output shaft of the motor. Therefore, such axial forces as centrifugal force and inertial force applied to the motor components when the vehicle corners are efficiently supported by the constant-velocity joint.

The axial forces may be managed by the structure for example as shown in FIG. 2. Specifically, in the structure having wheel hub 20 and the outer race of constant-velocity joint 30 integrated into a single part, snap ring 35 that axially restricts output shaft 90 of the motor and inner race 31 is installed. Before cap 37 is attached, snap ring 35 is installed from the outside of the vehicle to sufficiently support the axial forces.

However, since snap ring 35 is to be placed deeply, namely at a relatively large distance from the narrow opening, which faces the outside of the vehicle, of wheel hub 20, a small space is merely left for the work of installing snap ring 35, resulting in low workability.

Moreover, since the outer race of the constant-velocity joint and the wheel hub are integrated into a single part, a problem of a larger diameter of hub bearing 40 arises.

EMBODIMENTS OF THE INVENTION

Figure 3:
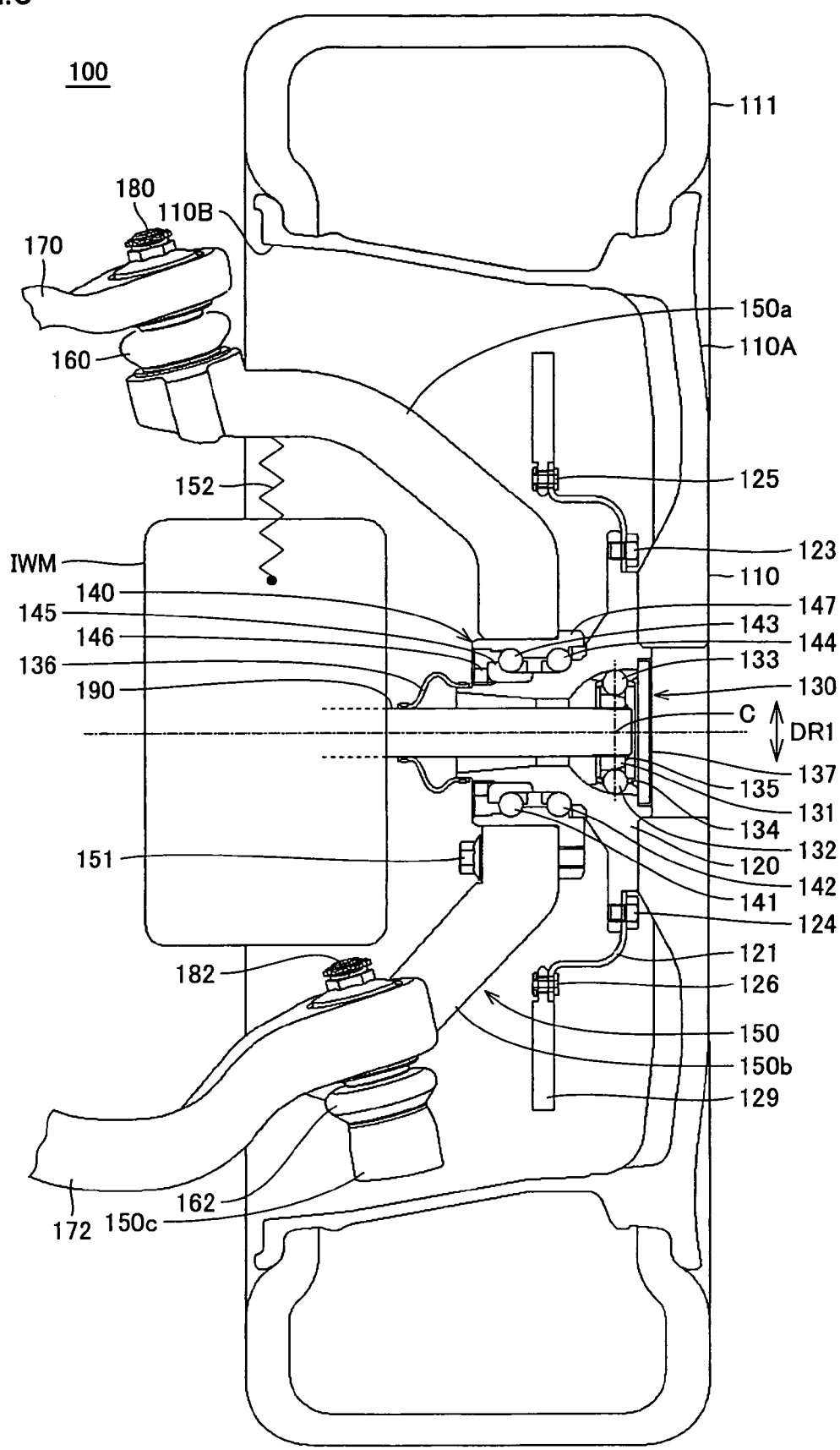
FIG. 3 shows a structure of a motor-driven wheel 100 according to an embodiment of the present invention.

FIG. 3 shows a structure of a motor-driven wheel 100 according to an embodiment of the present invention.

Referring to FIG. 3, firstly the entire structure of the motor-driven wheel is described. Motor-driven wheel 100 includes a wheel disc 110, a wheel hub 120, a knuckle 150, a hub bearing 140, a constant-velocity joint 130, an in-wheel motor IWM, and a spring 152.

Motor-driven wheel 100 is supported by a suspension arm that is a wheel support unit. The suspension arm includes an upper arm 170 and a lower arm 172. Upper arm 170 and an upper knuckle 150a are connected by a kingpin 180 and a ball joint 160. Lower arm 172 and a lower knuckle 150c are connected by a kingpin 182 and a ball joint 162. Lower knuckles 150b and 150c are connected behind lower arm 172 as seen in FIG. 3.

The structure of the components each is now described.

Wheel disc 110 is substantially in the shape of a cup and includes a disc portion 110A and a rim portion 110B. Wheel disc 110 houses therein wheel hub 120, a disc rotor 129, hub bearing 140, constant-velocity joint 130 and in-wheel motor IWM. A tire 111 is secured to the outer edge of rim portion 110B of wheel disc 110.

Wheel disc 110 is coupled for example at disc portion 110A to wheel hub 120, using such fastening members as bolts (not shown).

To wheel hub 120, a disc support member 121 is attached with bolts 123, 124. To the outer periphery of disc support member 121, disc rotor 129 is attached with bolts 125, 126.

Wheel hub 120 is rotatably supported by hub bearing 140. Hub bearing 140 is secured with knuckle 150 and a bolt 151. In-wheel motor IWM has its casing connected to knuckle 150 through spring 152 that is an "elastic member." Thus, while in-wheel motor IWM is supported so that it does not rotate with respect to knuckle 150, in-wheel motor IWM is supported so that it can vibrate in the up-and-down direction DR1 of the vehicle's body.

An output shaft 190 of in-wheel motor IWM is connected to constant-velocity joint 130. Constant-velocity joint 130 permits angular displacement between the rotational axis of output shaft 190 and the rotational axis of wheel hub 120.

Upper arm 170 and lower arm 172 are placed to sandwich in-wheel motor IWM in the up-and-down direction DR1 of the vehicle's body. Upper arm 170 has its one end coupled by ball joint 160 and kingpin 180 to upper knuckle 150a. Upper arm 170 has the other end (not shown) fixed to the vehicle's body so that it can turn around in the up-and-down direction DR1 of the vehicle's body.

Lower arm 172 has it one end coupled by kingpin 182 and ball joint 162 to lower knuckle 150c. Lower arm 172 has the other end (not shown) fixed to the vehicle's body so that it can turn around in the up-and-down direction DR1 of the vehicle's body. Lower arm 172 is coupled through a shock absorber (not shown) to the vehicle's body. Accordingly, motor-driven wheel 100 is suspended from the vehicle's body.

A feature of the structure shown in FIG. 3 is that the center of swing C of constant-velocity joint 130 is placed closer to the outside of the vehicle as compared with the example to be studied that is shown in FIG. 1. Thus, center-of-swing C is positioned closer to the outside of the vehicle than hub bearing 140 is and constant-velocity joint 130 is also placed closer to the outside of the vehicle relative to hub bearing 140. Hub bearing 140 can thus be reduced in diameter.

Figure 4:
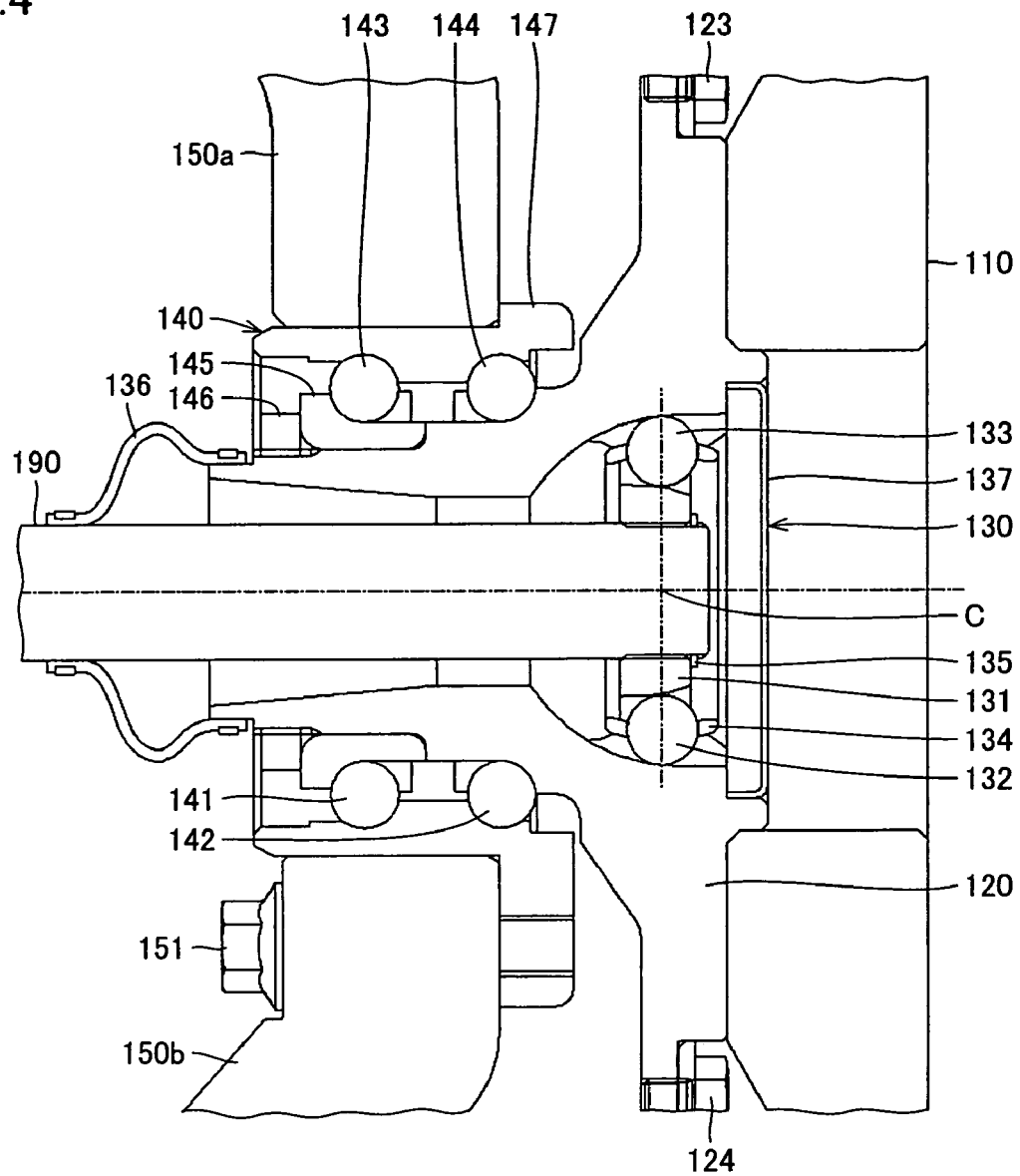
FIG. 4 is an enlarged view of a constant-velocity joint 130, a hub bearing 140 and their neighborhood in FIG. 3.

FIG. 4 is an enlarged view of constant-velocity joint 130, hub bearing 140 and their neighborhood in FIG. 3.

Referring to FIG. 4, hub bearing 140 includes a hub bearing casing 147, balls 141-144, a ball holding ring 145 that holds balls 141, 143, and a nut 146 for holding ball holding ring 145 to prevent ball holding ring 145 from coming off wheel hub 120. Hub bearing casing 147 of hub bearing 140 is fixed at lower knuckle 150b of knuckle 150 by flanged bolt 151.

Constant-velocity joint 130 includes an inner race 131 spline-fitted with output shaft 190 of the motor, a snap ring 135 preventing inner race 131 from coming off output shaft 190, balls 132, 133, a cage 134 restraining the positions of balls 132, 133, and a boot 136 and a cap 137 for preventing leakage of grease enclosed in the inside.

The outer race of constant-velocity joint 130 and wheel hub 120 are integrated into a single part, and motive power transmitted from output shaft 190 of the motor is first transmitted from inner race 131 to balls 132, 133. Balls 132, 133 are "rolling bodies" transmitting motive power while rolling. The motive power is then transmitted from balls 132, 133 to wheel hub 120 integrated with the outer race into a single part.

The outer race of constant-velocity joint 130 has two openings. One is a first opening facing the outside of the vehicle and covered with cap 137. The other is a second opening facing the inside of the vehicle, namely facing the place where the motor is positioned. Output shaft 190 passes through the second opening and the second opening is covered with boot 136. The first opening is larger than the second opening.

As compared with the structure shown in FIG. 2, the structure shown in FIG. 4 has center-of-swing C of constant-velocity joint 130 that is further closer to the outside of the vehicle relative to hub bearing 140. Since such components of constant-velocity joint 130 as inner race 131, balls 132, 133 and cage 134 are placed differently in position from hub bearing 140, the diameter of hub bearing 140 can be reduced.

Further, since the diameter of the first opening of the outer race that faces the outside of the vehicle is larger than the diameter of an assembly into which cage 134, balls 132, 133 and inner race 131 are assembled, the assembly can be inserted into and spline-fit with output shaft 190. Then, snap ring 135 is used for securing. Here, snap ring 135 is placed further closer to the outside of the vehicle as compared with the snap ring shown in FIG. 2. Accordingly, the space for the work of installing the snap ring is larger and shallower to facilitate installation of snap ring 135. Installation of constant-velocity joint 130 is thus facilitated.

Furthermore, under the condition that respective motors in FIG. 2 and FIG. 4 swing to the same extent, the swing angle of constant-velocity joint 130 in FIG. 4 can be made smaller than that shown in FIG. 2 since the center of swing in FIG. 4 is farther from the motor.

Figure 5:
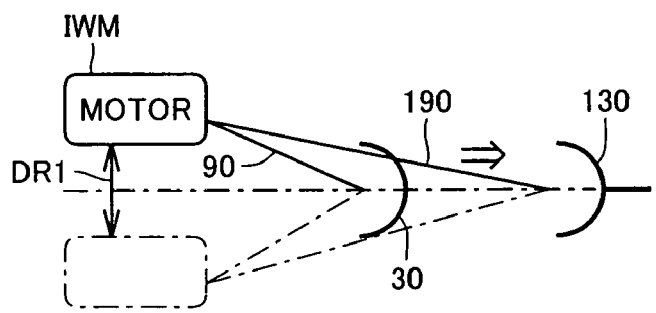
FIG. 5 is a schematic for illustrating the swing angle of the constant-velocity joint, making a comparison between the example to be studied and the embodiment of the present invention.

FIG. 5 is a schematic for illustrating the swing angle of the constant-velocity joint, making a comparison between the aforementioned example to be studied and the present embodiment of the invention.

Referring to FIG. 5, under the condition that in-wheel-motor IWM in FIGS. 1 and 2 and in-wheel-motor IWM in FIGS. 3 and 4 swing in the up-and-down direction DR1 of the vehicle's body to the same extent, the swing angle of constant-velocity joint 130 in FIGS. 3 and 4 is smaller than that of constant-velocity joint 30 in FIGS. 1 and 2 since constant-velocity joint 130 is at a larger distance from the motor, as shown in FIG. 5. Thus the constant-velocity joint can have a smaller swing angle. Any constant-velocity joint smaller in size may accordingly be employed.

While the embodiment of the present invention uses spring 152 as an example of the elastic member, any of such elastic members as rubber and damper having a rubber in which oil is enclosed or a combination thereof may be used instead.

According to the present invention, vibrations transmitted, depending on road conditions for example, to motor-driven wheel 100 while the vehicle is running cause the elastic member to vibrate motor IWM, which is a load member, in the up-and-down direction DR1 of the vehicle's body, with the vibrations shifted in phase. Consequently, large vibrations are not transmitted to the vehicle's body which is a sprung part (vibrations are cancelled). In this way, the ride comfort of the vehicle having the wheel unit mounted thereon and driven by in-wheel motor IWM is improved.

Moreover, according to the present invention, the constant-velocity joint has the outer race including the opening facing the outside of the vehicle that is larger and shallower, and the constant-velocity joint is placed with its center of swing placed closer to the outside of the vehicle relative to the hub bearing. Accordingly, the motor can be axially supported while avoiding an increase in diameter of the hub bearing as well as deterioration in ease of installation of the snap ring serving to axially restrict the output shaft transmitting motor torque and the inner race.

In addition, a certain distance can be kept between the motor and the constant-velocity joint to make smaller the swing angle of the constant-velocity joint relative to the extent to which the motor swings.

In this way, the motor-driven wheel can be provided that can support such an axial force as centrifugal force applied to the output shaft of the motor when the vehicle corners for example and is improved in productivity and smaller in size.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A motor-driven wheel comprising:

a motor supported swingably in up-and-down direction of a body of a vehicle and rotating a wheel unit;

a hub bearing rotatably supporting said wheel unit; and a constant-velocity joint provided on a power transmission path extending from an output shaft of said motor to said wheel unit and having its center of swing located closer to outside of the vehicle relative to said hub bearing, said constant-velocity joint including an outer race integrated, with a wheel hub to which a wheel of said wheel unit is fixed, into a single part, and having a first opening facing the outside of the vehicle, an inner race connected to the output shaft of said motor in a manner that allows motive power to be transmitted, and a rolling body transmitting the motive power between said inner race and said outer race.

2. The motor-driven wheel according to claim 1, further comprising a knuckle connected to a suspension arm attached to the body of the vehicle, wherein said motor is connected through an elastic member to said knuckle.

3. The motor-driven wheel according to claim 2, wherein said hub bearing is fixed to said knuckle.

4. The motor-driven wheel according to claim 1, wherein said constant-velocity joint further includes a cage restraining position of said rolling body, and said first opening is larger in diameter than an assembly into which said cage, said rolling body and said inner race are assembled.

5. The motor-driven wheel according to claim 1, wherein said outer race further has a second opening facing inside of the vehicle, and a rotational shaft connected to said inner race passes through said second opening, said first opening is larger than said second opening, and said hub bearing rotatably supports a portion where said rotational axis passes through of said outer race integrated with said wheel hub into the single part.

6. The motor-driven wheel according to claim 1, further comprising a cap covering said first opening.

* * * * *